United States Patent
Zhang et al.

(10) Patent No.: US 11,853,918 B2
(45) Date of Patent: Dec. 26, 2023

(54) PROCESSING TRANSACTIONS INVOLVING CARD READER DEVICES

(71) Applicant: STRIPE, INC., San Francisco, CA (US)

(72) Inventors: Michelle Zhang, San Francisco, CA (US); Zachary Yellin-Flaherty, San Francisco, CA (US); Nikunj Handa, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 527 days.

(21) Appl. No.: 17/064,414

(22) Filed: Oct. 6, 2020

(65) Prior Publication Data

US 2022/0108283 A1   Apr. 7, 2022

(51) Int. Cl.
*G06Q 20/02* (2012.01)
*G06Q 20/20* (2012.01)
(Continued)

(52) U.S. Cl.
CPC .......... *G06Q 20/02* (2013.01); *G06K 7/0021* (2013.01); *G06K 7/087* (2013.01); *G06Q 20/202* (2013.01);
(Continued)

(58) Field of Classification Search
CPC .... G06Q 20/02; G06Q 20/202; G06Q 20/204; G06Q 20/34; G06Q 20/40; G06K 7/0021; G06K 7/087
(Continued)

(56) References Cited

U.S. PATENT DOCUMENTS 5,931,917 A * 8/1999 Nguyen ................ G06Q 20/00
                                                        709/216
8,086,493 B2   12/2011 Erikson
(Continued)

FOREIGN PATENT DOCUMENTS

KR   1020100086565 A   8/2010
KR     101767534 B1    8/2017

OTHER PUBLICATIONS

Anonymous. Merchant Warehouse Expands Product Line With Encrypted Swiped, Keyed and All-in-One Payment Devices; Integration With ID TECH Creates Another "Out-of-Scope" Secure Payment Solution. Business Wire; New York [New York]. Jul. 25, 2011. (Year: 2011).*

(Continued)

*Primary Examiner* — Nathan C Uber
*Assistant Examiner* — Fawaad Haider
(74) *Attorney, Agent, or Firm* — Womble Bond Dickinson (US) LLP

(57) ABSTRACT

A method and apparatus for processing a commerce transaction performed with a terminal reader for reading a card are disclosed. In one embodiment, the method includes receiving transaction information for a merchant regarding a transaction involving the terminal reader without the terminal reader having an assigned terminal identifier (TID) that is used for transaction authorization and assigning the terminal reader a pre-allocated TID for the merchant as the assigned TID, where the pre-allocated TID is selected from a group of one or more pre-allocated available terminal IDs (TIDs) associated with the merchant, and using that pre-allocated TID to obtain authorization for the transaction.

19 Claims, 7 Drawing Sheets

(51) Int. Cl.
*G06K 7/00* (2006.01)
*G06Q 20/40* (2012.01)
*G06K 7/08* (2006.01)
*G06Q 20/34* (2012.01)

(52) U.S. Cl.
CPC ........... *G06Q 20/204* (2013.01); *G06Q 20/34* (2013.01); *G06Q 20/40* (2013.01); *G06Q 20/401* (2013.01)

(58) Field of Classification Search
USPC .......................................................... 705/17
See application file for complete search history.

(56) References Cited

U.S. PATENT DOCUMENTS

| | | | | |
|---|---|---|---|---|
| 2004/0118914 A1* | 6/2004 | Smith | ................... | H04M 17/10 235/380 |
| 2006/0259388 A1* | 11/2006 | Morea | ................ | G06Q 30/0601 705/64 |
| 2010/0121701 A1* | 5/2010 | Nguyen | ................ | G06Q 20/20 705/17 |
| 2010/0299265 A1 | 11/2010 | Walters et al. | | |
| 2014/0114857 A1 | 4/2014 | Griggs et al. | | |
| 2015/0161609 A1* | 6/2015 | Christner | ........... | G06Q 20/4016 705/44 |

OTHER PUBLICATIONS

International Preliminary Search Report and Written Opinion on the Patentability of Application No. PCT/US2021053848 dated Jan. 27, 2022, 10 pages.

International Preliminary Report on Patentability received for PCT Patent Application No. PCT/US21/53848, dated Apr. 20, 2023, 7 pages.

\* cited by examiner

PROCESSING TRANSACTIONS INVOLVING CARD READER DEVICES

FIELD OF THE INVENTION

Embodiments of the present invention relate to the field of systems for processing commercial transactions; more particularly, embodiments of the present invention relate to processing transactions from card reader devices in a card present payment platform that occur before onboarding of the card reader devices has completed.

BACKGROUND OF THE INVENTION

Today, many merchants use third parties to handle all their payment processing needs for commercial transactions. In some cases, the merchants redirect their customers to the third party, who is responsible for capturing the payment information and processing the transaction, or the merchants capture payment information themselves from their customers and send it to a third-party payment gateway for real-time authorization of transactions and subsequent settlement of funds.

Certain third-party payment gateways perform payment processing for transactions that occur on card present networks. These card present networks perform transactions that use card reader devices to obtain data from cards (e.g., credit cards, debit cards, payment cards, etc.) as part of completing the transactions. In some networks, before a third-party payment gateway can process the transactions for a merchant, the merchant is onboarded so that the merchant is integrated into the third-party payment gateway's payment processing environment. The onboarding process may include notifying a card network that the merchant is having some, if not all, of its payments processed by the third-party payment gateway. In certain networks, such as, for example, a card present, debit card network commonly known as Interac, onboarding a merchant requires onboarding both the merchant and all physical card reader devices, or terminal readers, the merchant planned to use for processing transactions onto the card network's partner (e.g., Payfacto in the case of Interac) before the users are able to process transactions. This is an asynchronous process that can take 15 minutes or longer, which prevents the third-party payment gateway from providing "instantaneous onboarding", e.g. transactions of the merchant's customers can start being processed as soon as they create a legitimate account on the payment processor and should not be blocked while waiting on completion of the onboarding process before being able to make transactions.

SUMMARY

A method and apparatus for processing a commerce transaction performed with a terminal reader for reading a card are disclosed. In one embodiment, the method comprises: receiving, by network communication interface, transaction information for a merchant regarding a transaction involving the terminal reader without the terminal reader having an assigned terminal identifier (TID) that is used for transaction authorization; in response to receiving the transaction information, creating, via one or more payment processing servers, an authorization request message with an assigned TID to request authorization of the transaction, including determining the terminal reader has no assigned TID and assigning the terminal reader a pre-allocated TID for the merchant as the assigned TID, the pre-allocated TID being selected from a group of one or more pre-allocated available terminal IDs (TIDs) associated with the merchant; sending, over a network via a network communication, the authorization request message with the TID to a payment authorization server to obtain authorization for the transaction; and receiving, by the one or more payment processing servers from the payment authorization server, an indication as to whether the transaction is authorized.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
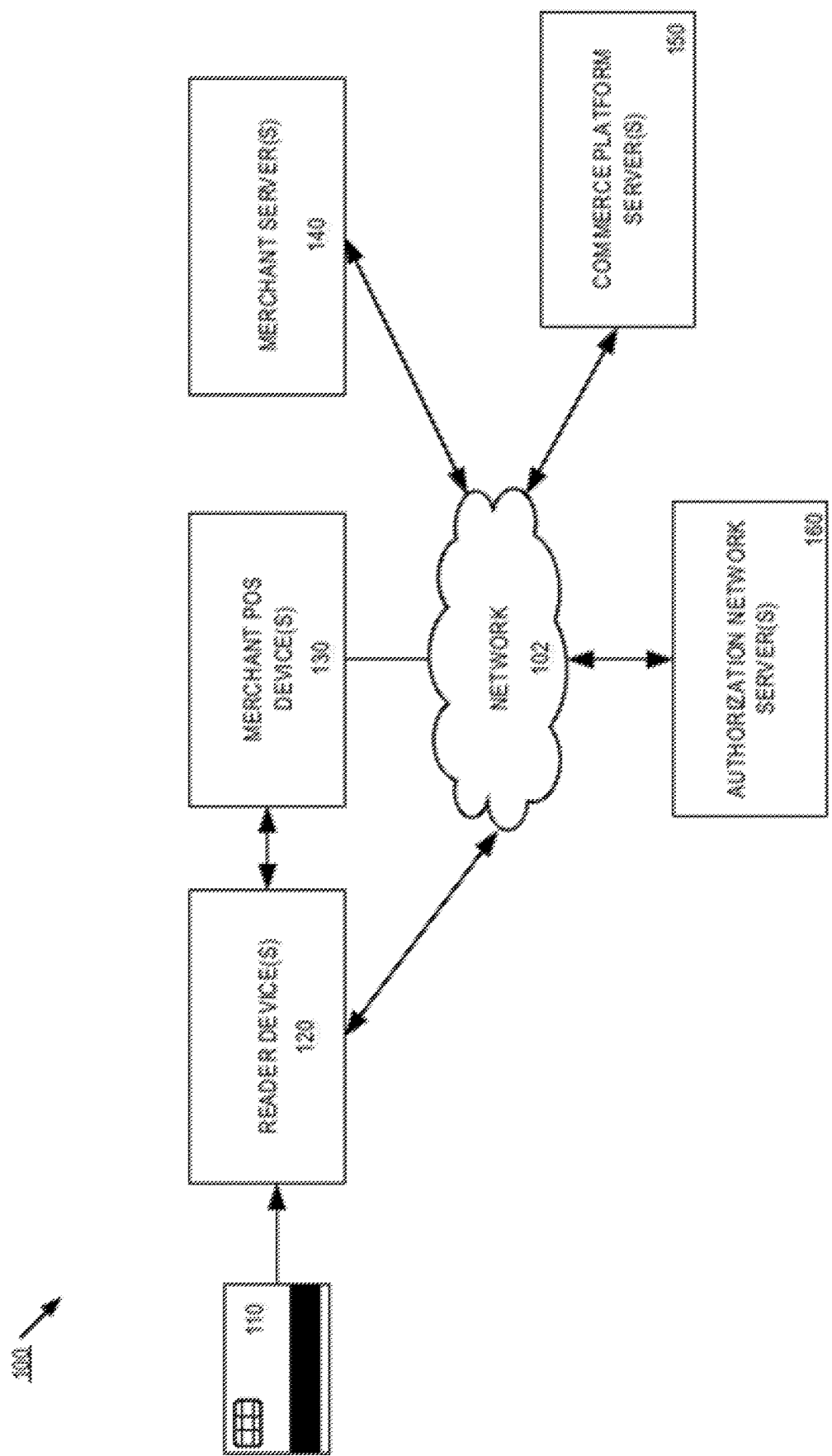
FIG. 1 is a block diagram of an exemplary system architecture for reader device activation and management.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Certain terminology is used herein for convenience only and is not to be taken as a limitation on the present invention.

Embodiments of the present invention are described in the context of an online payment acceptance service called Stripe® commercialized by Stripe, Inc., San Francisco, California.

The following definitions are provided to promote understanding of the present invention.

Card Network (or Card Association)—refers to financial payment networks such as Visa®, MasterCard®, American Express®, Diners Club®, JCB® and China UnionPay®.

Processor—A processor is a company (often a third party) appointed to handle credit card transactions. They have connections to various card networks and supply authorization and settlement services to merchants or payment service providers. They can also move the money from the issuing bank to the merchant or acquiring bank.

Payment Information—In one embodiment for making payment via a credit card or debit card, the payment information includes primary account number (PAN) or credit card number, card validation code, expiration month and year. In another embodiment for making payment via an Automated Clearinghouse (ACH) transaction, the payment information includes a bank routing number and an account number within that bank. The payment information includes at least some sensitive, non-public information.

Merchant—A merchant, as used herein, is an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

Payment Processor—A payment processor, as referred to herein, is an entity or a plurality of entities that facilitate a transaction between a merchant site and a customer's electronic device. The payment processor includes selected functionality of both Stripe and Processor/Card Networks. The Processor/Card Networks is involved in authorizing or validating payment information. In one embodiment, Stripe and the Processor/Card Networks function together to authorize and validate payment information and settle any charges that are made. Accordingly, in one embodiment, the payment processor refers to the functionality of Stripe and the functionality of the processor/card networks. In another embodiment, Stripe performs its own verification, and the Processor/Card Networks are still used for settling any charges that are made. Accordingly, in this embodiment, the payment processor may refer only to the functionality of Stripe.

Overview

Techniques are disclosed herein for processing commerce transactions with a payment processor that is part of a commerce platform. In one embodiment, the commerce platform has one or more servers to process the commerce transactions, including one or more servers to process payments on behalf of merchants in the commerce platform. In one embodiment, at least some of the commerce transactions processed by the commerce platform are performed with reader devices, referred to herein as terminal readers, that read information from a card (e.g., debit card, credit card, payment card, etc.) as part of the transaction between a merchant and an individual. In one embodiment, these transactions are card present transactions.

In one embodiment, as part of authorizing a transaction and/or a payment with respect to the transaction that involves a reader device, an identifier (e.g., a terminal ID (TID)) for the reader device, along with other transaction information, is sent to a transaction/payment authorization entity for approval. In one embodiment, the TID is used to identify the reader device to the transaction/payment authorization entity, which only authorizes transactions involving reader devices that have been assigned and valid TIDs. In one embodiment, the assignment of the TID occurs when the reader device is set up and connected into the commerce platform. In one embodiment, this occurs when and as part of the process of onboarding the merchant into the commerce platform.

In one embodiment, the commerce platform is able to authorize transactions involving valid (e.g., non-fraudulent) reader devices of merchants even though the reader device hasn't yet been assigned a TID that would be needed for transaction authorization. In one embodiment, this is accomplished by assigning the reader device (the terminal reader) a pre-allocated TID for the merchant as the assigned TID if the terminal reader has no assigned TID. In one embodiment, this pre-allocated TID is created for assignment to reader devices of the merchant. In one embodiment, pre-allocated TID is generic and not designated to only be assigned to reader devices of the merchant (when it was originally allocated).

In one embodiment, the commerce platform maintains a group of pre-allocated TIDs associated with the merchant that are available to assign to reader devices. In one embodiment, when a transaction information for a transaction involving a reader device is received by a payment processor (or another system of the commerce platform) and the reader device does not have an assigned TID to enable the transaction to be authorized, the payment processor assigns the reader device a pre-allocated TID for the merchant as the assigned TID from the group of one or more pre-allocated available TIDs associated with the merchant (or other party) and then uses that assigned TID for obtaining authorization for the transaction and/or its associated payment. This use may include creating and sending a transaction and/or payment authorization request message with the TID to a payment authorization server to obtain authorization for the transaction and/or its associated payment. Note that authorization for a transaction and a payment for the transaction may be considered the same for purposes herein where the determination to make the payment is based at least in part on whether the transaction has been determined to be authorized.

In one embodiment, the group of pre-allocated TIDs is maintained by the payment processor or a system of the commerce platform (e.g., onboarding server or system.). The payment processor/system determines whether TIDs in the group not yet assigned to any terminal reader of the merchant are less in number than a threshold (e.g., 100 pre-allocated TIDs) for the merchant. If this is the case, the payment processor/system in the commerce platform sends an onboarding request (e.g., a network communication signal) to an onboarding server to allocate and send more pre-allocated TIDs for the group. In this case, the onboarding server operates as a TID allocation server. In one embodiment, the onboarding server comprises or is part of the payment authorization server that authorizes transactions from the reader devices of the merchant. In an alternative embodiment, the onboarding service and payment authorization server are separate but under control of the same entity. In one embodiment, the request includes a new onboarding record for one or more TIDs to be pre-allocated.

FIG. 1 is a block diagram of an exemplary system architecture 100 for a commerce transaction processing system that uses one or more reader devices. In some embodiments, each reader device is used for processing merchant payments with a commerce platform.

Figure 7:
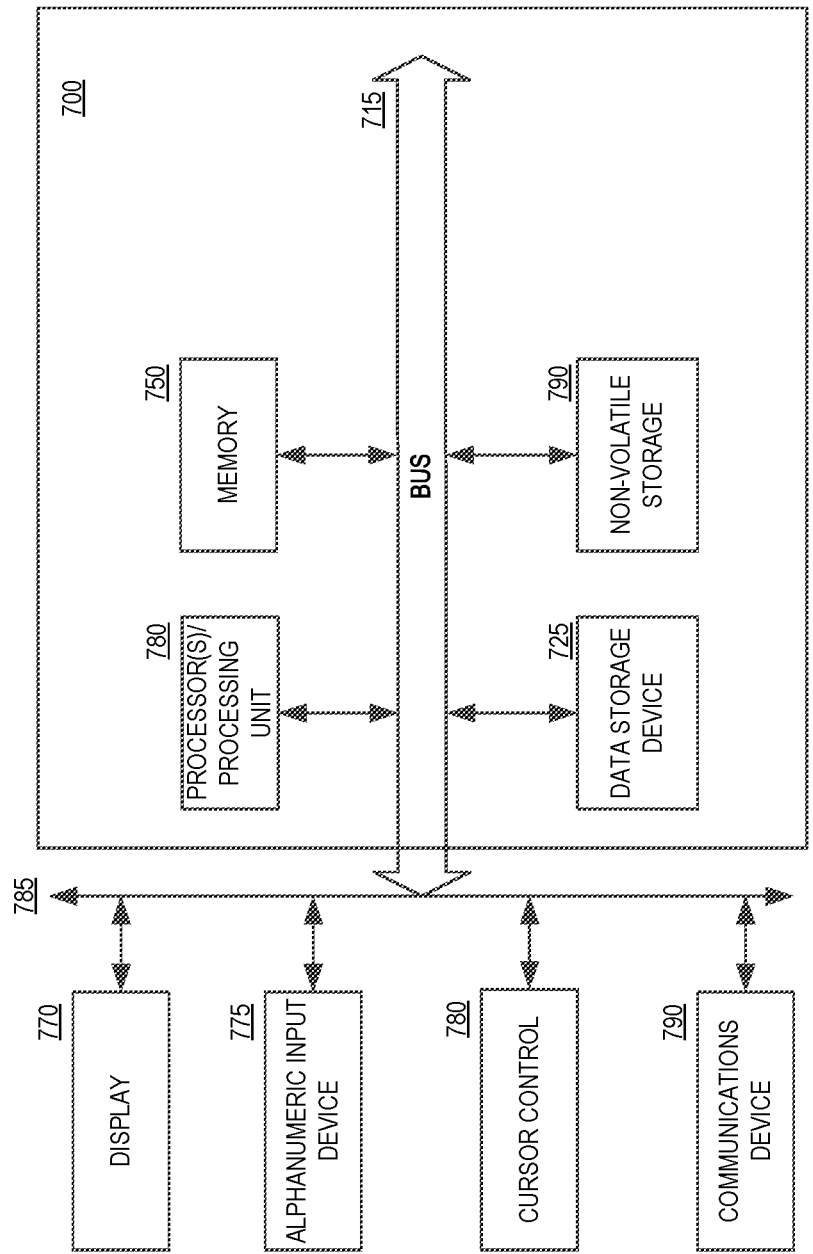
FIG. 7 is a block diagram of one embodiment of a computer system.

In one embodiment, the system includes one or more reader devices 120, one or more point of sale (POS) devices 130, one or more merchant servers 140, one or more commerce platform servers 150, and one or more authorization network servers 160. In one embodiment, POS devices 130 may be computing devices, such as a smartphone, tablet computer, laptop computer, computerized, or other hardware device that implements a payment application of a merchant. In one embodiment, the payment application is an application that enables an employee or agent of the merchant to collect payment and complete transactions for goods or services offered by the merchant. In some embodiments, the application may be a web-based application served by one or more of the merchant server(s) 140 or other computer servers at the direction of the merchant. Furthermore, merchant server(s) 140, authorization network server(s) 160, and commerce platform server(s) 150 are also computing devices, such as server computers, desktop computers, etc. that include typical computing hardware, as illustrated in FIG. 7 below.

Reader device(s) 120 are also computer processing devices that are each communicatively coupled with one of the POS device(s) 130 over a wireless communications link, such as a Bluetooth, Zigbee, or another wireless communications link. In some embodiments, the wireless communication link is secured by a secure protocol for the exchange of information, such as utilizing symmetric or asymmetric encryption-based communications.

In embodiments, the reader device(s) 120 may include one or more mobile reader devices that do not include a display or other user interfaces (e.g., keys, buttons, etc.). In some embodiments, the mobile reader device interacts with the merchant's POS device 130 to which it is communicably coupled to use the mobile reader device for performing transactions using the services of commerce platform server(s) 150. A payment processor is one example of a commerce platform, or a portion thereof. In some embodiments, the mobile reader device can include a card reader (e.g., an integrated circuit or smart chip reader, a magnetic strip reader, a near field communication reader, etc.), a memory, a network interface for establishing wireless communications links, and at least one processor, as well as other hardware components typically associated with mobile reader devices.

In some embodiments, the reader device(s) may include one or more personal identification number (PIN) pad reader devices. In one embodiment, the PIN pad reader device includes a display (e.g., an LCD, LED, or other display screen), an input/output (I/O) controller for communicating user input that a user of the PIN pad reader device provides during the completion of a transaction, such as input from buttons, touch pads, as well as other user interface components, to a merchant POS device 130 via a network interface. The PIN pad reader device may also include a memory, at least one processor, and a card reader. Furthermore, the PIN pad reader device may also include local area network, wide area network, or other network communications connectivity, established by a network interface, for exchanging communications with remote systems over a network.

Furthermore, the reader device(s) illustrated in FIG. 1 can include a mixture of different kinds of reader devices each communicatively coupled with different merchant POS devices. Furthermore, additional types of reader devices may be used instead of, or in addition to, the PIN pad reader devices and the mobile reader devices discussed herein. In any embodiment, the reader device(s) are responsible for collecting consumer payment card data (e.g., EMV card data) by scanning a magnetic strip, reading an integrated circuit, receiving user input, etc. from or associated with a payment card 110.

Once card data 110 is read by a reader device 120, the card data is provided by the reader device to the commerce platform server(s) 150 for performing one or more payment processing operations. In one embodiment, this can include one or more of tokenizing, authorizing, and/or approving one or more financial aspects associated with the transaction. In some embodiments, a PIN pad reader device may interact with commerce platform server(s) using network connectivity of the PIN pad reader device, as discussed in greater detail below in FIG. 2. In other embodiments, a mobile reader device uses a mobile software development kit (SDK) installed and executing on a merchant POS device to which the mobile reader device is communicatively coupled to interact with commerce platform server(s). In either embodiment, the mobile SDK or the direct communications between a PIN pad reader device and commerce platform server(s) handles any received card data in such a way that it is not exposed to any merchant system thereby preventing merchant software or merchant POS device(s) 130 running a POS checkout application or the merchant server(s) 140 from being subject to the scope of PCI compliance requirements. Instead, a token is generated by commerce platform server(s) 150 after authorizing a transaction with authorization network server(s) 160 (e.g., card brand systems, issuing bank systems, etc.), and the token provided form the reader device 120 to the merchant POS device 130. The merchant's POS checkout application may then use the token authorizing the transaction to complete the transaction, and further provide the token to merchant server(s) 140 for subsequent use in obtaining remuneration identified by the token by interacting with the commerce platform server(s). Furthermore, one embodiment of techniques and systems for tokenizing transactions using services of a commerce platform are described in U.S. Pat. No. 9,830,596, issued on Nov. 28, 2017, titled "Method for Conducting a Transaction Between a Merchant Site and a Customer's Electronic Device Without Exposing Payment Information to a Server-Side Application of the Merchant Site."

The merchant POS device(s) 130, merchant server(s) 140, commerce platform server(s) 150, authorization network server(s) 160, and embodiments of the reader device(s) 120 may be coupled to a network 102 and communicate with one another using any of the standard protocols for the exchange of information. In one embodiment, one or more of the merchant POS device(s) 130, merchant server(s) 140, commerce platform server(s) 150, authorization network server(s) 160, and embodiments of the reader device(s) 120 may run on one Local Area Network (LAN) and may be incorporated into the same physical or logical system, or different physical or logical systems. Alternatively, one or more of the merchant POS device(s) 130, merchant server(s) 140, commerce platform server(s) 150, authorization network server(s) 160, and embodiments of the reader device(s) 120 may reside on different LANs, wide area networks, cellular telephone networks, etc. that may be coupled together via the Internet but separated by firewalls, routers, and/or other network devices. In one embodiment, commerce platform server(s) 150 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc. Furthermore, in embodiments, merchant POS device(s) 130, merchant server(s) 140, commerce platform server(s) 150, authorization network server(s) 160, and embodiments of the reader device(s) 120 may communicate with one another via network 102 using any of the protocols for the exchange of information, such as secure protocols including TLS, SSL, SSH, etc.

In one embodiment, a merchant may obtain a new reader device for use by employees and/or agents of the merchant. This typically occurs when an existing reader device breaks or a new reader device is needed for use by new employees. In some embodiments, a commerce platform (e.g., the commerce platform providing payment services via commerce platform server(s) 150) sends the new reader device to the merchant for deployment at a location associated with the merchant (e.g., a store, kiosk, etc. having a physical real-world location). However, before the new reader device can be used for performing financial transactions as discussed herein, registration, discovery, and activation of the new reader device are performed so that the new reader device can interact with a merchant POS device via a wireless communications link, trust is established in the new reader device, and communication between devices is secured.

Figure 2:
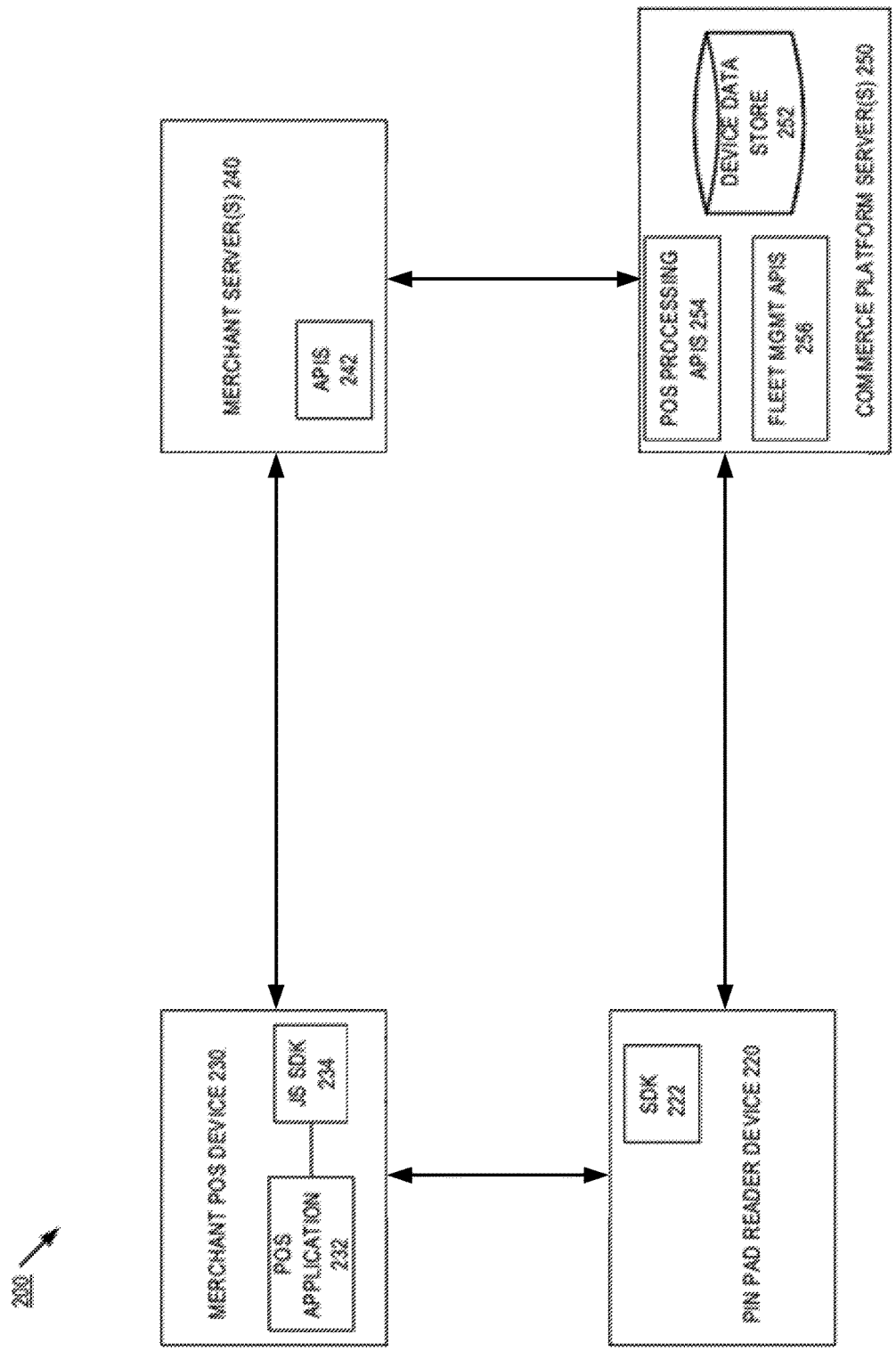
FIG. 2 is a block diagram of one embodiment of using PIN pad reader devices in conjunction with a POS device, merchant server(s), and commerce platform server(s).

In one embodiment, a process and system for registering, discovering, activating, and using a new PIN pad reader device is illustrated in FIG. 2. In some embodiments, the PIN pad reader device 220, merchant POS device 230, merchant server(s) 240, and commerce platform server(s) 250 provide additional detail for the reader device(s) 120, merchant POS device(s) 130, merchant server(s) 140, and commerce platform server(s) 150 discussed above in FIG. 1. Note that in one embodiment, the PIN pad reader device 220 and the merchant POS device 230 are part of the same device.

In some embodiments, prior to its use, the PIN pad reader device is registered, discovered, and activated by processing logic of the PIN pad reader device, the merchant POS device, one or more merchant server(s), and one or more commerce platform server(s). The processing logic may comprise hardware (circuitry, dedicated logic, etc.), software (such as is run on a general-purpose computer system or a dedicated machine), firmware, or a combination for performing the operations discussed herein. For example, the processing logic can reside in functions of a software development kit (SDK) 222 providing software for operating PIN pad reader device 220, functions of a javascript (JS) SDK 234 providing functions for us by a POS application 232, application programming interface(s) executing on a merchant server(s) 240, and one or more sets of APIs (e.g., POS processing APIs 254 and fleet management APIs 256) executing on commerce platform server(s) 250. In embodiments, the SDKs and APIs are software packages, libraries, function, routines, etc. generated and distributed by commerce platform server(s) for seamlessly implementing financial transaction operations using the services of commerce platform server(s) 250.

After activation, the PIN pad reader device 220 can be used to capture card data during a transaction between a merchant and a customer. The POS application on the merchant POS device 232 creates a transaction and transmits an instruction to the PIN pad reader device 263 to capture card data for a transaction and a requested amount for the transaction. In one embodiment, the merchant POS device 230 receives input from a user that specifies the transaction amount, which the JS SDK 234 uses to construct a payment intent object. In some embodiments, the payment intent object is a data structure, data object, etc. defined by the JS SDK 234 and understood by the SDK 222 that holds data including at least the transaction amount and merchant identifiers. A reader of the PIN pad reader device 220 is activated by the SDK 222 in response to receipt of the request from the merchant POS device including the payment intent object, and card data of the customer is captured by a card data reader of the PIN pad reader device 220, which is attached to the payment intent object by the SDK 222 running on the PIN pad reader device 220.

The SDK 222 running on the PIN pad reader device 220 encrypts the card data using an encryption key and transfers the encrypted card data encrypted to the commerce platform server(s) 250, directly or indirectly through the merchant POS device 230 in a request that the transaction be authorized in the requested amount as specified by the payment intent object. The POS processing APIs 254 decrypt the card data by matching received PIN pad reader device identifiers to a corresponding scoped encryption key, and clear the transaction with one or more authorization server(s) (e.g., card brand and issuing bank server(s)). When the transaction is cleared, a return authorization is generated by commerce platform server(s) 250 and transmitted to PIN pad reader device in the form of a token (e.g., a unique identifier), that is then provided (again in encrypted form using the transaction encryption key) to the merchant POS device 230.

The JS SDK 234 receives the token authorizing the transaction and decrypts the token to obtain an authorization code, an authorized amount, time, location, last 4 digits of card charged, as well as other transaction data that can be provided to the customer in a transaction receipt. Furthermore, the JS SDK 234 may further proxy a request via merchant server(s) 240 to commerce platform server(s) 250 to determine that the token corresponds to a transaction that has been posted (e.g., funds and card data have been successfully captured by commerce platform server(s)).

The JS SDK 234 provides the token (in encrypted form) to the merchant server(s) 240, which uses API(s) 242 to forward the token periodically, as a batch with other tokens, or immediately in response to receiving the token, etc. to commerce platform server(s) 250. In embodiments, the token is encrypted by the merchant server(s) 240 with an encryption key having sufficient scope to enable the transfer of money between banks/card authorization servers and banks associated with the merchant.

In some embodiments, the series of communications exchanged during a transaction are not only for completing a transaction, but also for ensuring cardholder security at each step of the communication exchange. For example, cardholder data is encrypted before leaving the PIN pad reader device 220 to the commerce platform server(s) 250, and further tokens authorizing transactions are also encrypted before leaving the PIN pad reader device 220 to the merchant POS device 230 using a different transaction key. Additionally, customer card data is not provided to devices of the merchant at any time to prevent the merchant from being subject to PCI compliance requirements.

Onboarding Merchants with Terminal Readers for Card Network Platforms

A process and apparatus for onboarding merchants that utilize certain types of card network platforms. These card network platforms may include card-present networks such as for example, but not limited to, a card-present debit card only card network (e.g., Interac in Canada). Generally, in some embodiments, to onboard merchants onto a payment processor's card network platform, the payment processor sends an onboarding record to a transaction and/or payment authorization entity (e.g., system, server, etc.) for each merchant that will be processing transactions on that platform. For one or more card-present networks (e.g., Interac), onboarding a merchant requires onboarding both the merchant and all physical terminal readers the merchant planned to use for processing transactions with the card network's partner (e.g., Payfacto in the case of Interac) before users are able to perform transactions for the merchant. The card network partner is involved in authorizing or validating payment information. In one embodiment, the card network partner is the payment authorization entity that authorizes transactions that occur on the card network. To successfully onboard a set of merchants and its terminal readers, the payment processor (e.g., Stripe) sends a report to the payment authorization entity (e.g., Payfacto) and waits for the payment authorization entity to send back a report confirming that the merchant and its identified terminal readers have been onboarded properly. This is an asynchronous process that can take a number of minutes. With the report, the payment processor represents each merchant and terminal reader with a unique merchant ID (MID) (e.g., payment authorization entity (e.g., Payfacto) merchant ID) and terminal ID (TID) respectively. In one embodiment, each TID can also only be owned under a single MID.

In one embodiment, when transactions are being conducted with the terminal readers and authorization for those transactions is being sought, the payment processor does not pass the MID with the transaction authorization request and instead passes only the TID as part of a transaction authorization request to the transaction authorization entity (e.g., Payfacto), which means the terminal reader at least must be onboarded/assigned a valid TID before a merchant can make any transactions.

With such a card present commerce platform, in one embodiment, a payment processor may want to provide "instantaneous onboarding", e.g. they can start processing as soon as they create a legitimate account on the payment processor and should not have to be blocked while waiting for completion of the onboarding process before being able to make transactions. As mentioned above, some transaction authorizing entities (e.g., Payfacto) do not support instant onboarding, such that for each merchant to be onboarded, the payment processor (e.g., Stripe) submits the relevant details in an onboarding file and waits for a response from the transaction authorizing entity indicating onboarding has been completed before processing transactions. However, in one embodiment, at the time of onboarding, the payment processor doesn't know beforehand the number or which terminal readers a particular payment processor account (merchant account) might be using as part of transactions. Thus, a solution is needed to have at least some sort of onboarding done beforehand for the merchant's terminal readers or else processing of the transactions must wait until onboarding has completed.

In one embodiment, each merchant is assigned a unique merchant ID (MID), and each of their terminal readers is also assigned a unique TID mapped to the reader's unique serial number. In one embodiment, TIDs are unique even across MIDs. In one embodiment, to provide an appearance of instant onboarding, the payment processor maintains a pool of pre-allocated terminal IDs (TIDs) under each MID that could be selected and assigned to any new terminal readers of the MID. The selection from the pool and the assignment to a terminal reader may occur in response to the payment processor receiving transaction information as a result of a processing commerce transaction (e.g., Interac transactions) that involved a terminal reader of the merchant that had yet to be assigned a TID.

In one embodiment, in response to receiving a transaction for a transaction involving a terminal reader that doesn't already have a TID, because each transaction authorization message needs to include the TID of the terminal reader under which the transaction was processed, the payment processor assigns one of the available, pre-allocated TIDs to the terminal reader and includes that TID in the transaction authorization request/message sent to the transaction authorization entity (e.g., Payfacto) to obtain authorization for the transaction. Thus, because onboarding is not an instantaneous process, there is a possibility that a merchant could start making transactions (e.g., Interac transactions) on their terminal readers before the payment processor has had a chance to onboard them.

In one embodiment, when processing transactions, a payment processor determines whether the terminal reader involved with each transaction has an assigned TID and uses the assigned TID for a terminal reader if one exists when requesting transaction authorization (via an transaction authorization request/message sent to a transaction authorization entity or uses a pre-allocated, previously unassigned TID for the merchant if the terminal reader doesn't already have an assigned TID (e.g., the reader hasn't been onboarded at the time it was used for obtaining card data as part of a transaction).

Figure 3:
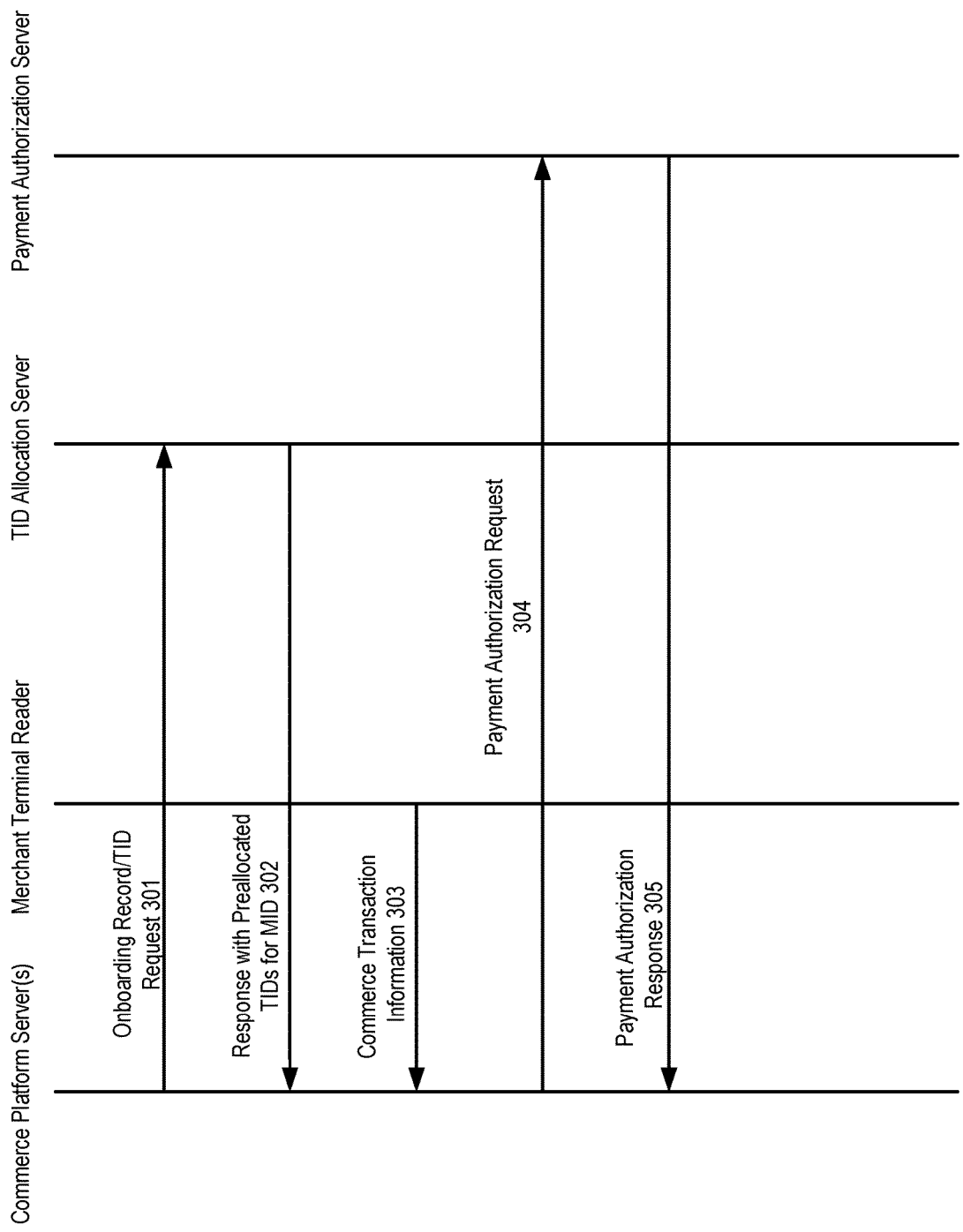
FIG. 3 is a data flow diagram illustrating obtaining and using one or more pre-allocated terminal identifiers (TIDs) for transactions.

FIG. 3 is a data flow diagram illustrating obtaining and using one or more pre-allocated terminal identifiers (TIDs) for transactions. In one embodiment, the communications depicted in FIG. 3 occur using signals sent as network communications across a network (e.g., the Internet).

Referring to FIG. 3, a commerce platform server(s) sends an onboarding record (301) that specifies a merchant being onboarded and includes a request for one or more TIDs to a TID allocation server. In one embodiment, the TID allocation server allocates the requested TIDs and associates them with the merchant. The TID allocation server sends a response (302) to the commerce platform server(s) with a set of one or more pre-allocated TIDs that the commerce platform server(s) will assign to terminal readers as transactions involving those terminal readers are received. For example, one of the terminal readers (or its associated POS) sends a transaction (303) to the commerce platform server(s). In response to the transaction, the commerce platform server(s) determines the TID that is assigned to the terminal reader, if any, to include in a transaction and/or payment authorization request, and uses one of the pre-allocated TIDs if the terminal reader is not already assigned a TID.

Note that the commerce platform server(s) maintains a storage (e.g., local storage, remote (e.g., cloud)-based storage, etc.) that has records that specify the terminal readers (e.g., terminal reader serial numbers or other indicia) and their associated TIDs and checks the storage when a transaction is received to determine if the terminal reader already has a TID. If the commerce platform server(s) determines that no TID has been assigned to the terminal reader, the commerce platform server(s) assigns a pre-allocated TID and stores the associate between that TID and the terminal reader in the storage for future use when additional transactions occur involving that terminal reader.

Thereafter, the commerce platform server(s) send the transaction and/or payment authorization request (304) to the authorization entity for authorization. In response thereto, the authorization entity sends a response (305) to the commerce platform server(s) indicating whether the transaction is authorized.

In one embodiment, the group of pre-allocated, previously unassigned TIDs that may be assigned to a terminal reader may include additional TIDs that are not assigned to the merchant that is associated with the terminal reader. In other words, a pre-allocated TID that is not associated with the MID of the reader may be assigned to the terminal reader for transaction authorization. In one embodiment, the payment processor (e.g., Stripe) has a MID and a pool of TIDs that are maintained under a payment processor (e.g., Stripe) "master" merchant account. These ID credentials serve as a last resort fallback when a merchant or some of the merchant's terminal readers have not yet completely onboarded onto the payment authorization entity (e.g., Payfacto), and therefore the merchant does not have their own complete set of credentials to use when making transactions.

In one embodiment, a terminal onboarding job is performed regular, or predefined, intervals (e.g., run every 6 hours) to check on each MID (including a payment processor-wide (e.g., Stripe-wide) MID) pool of available TIDs. If the number of TIDs not yet assigned to any terminal readers is low (e.g., 1, 2, 3, . . . , 10, . . . , 30 or lower) for a particular MID, the job sends new terminal onboarding records to the TID allocation server (e.g., the transaction/payment authorization entity (e.g., Payfacto)) to allocate a new batch of TIDs. Once other jobs pick up the onboarding response for these records from the TID allocation server (e.g., the transaction/payment authorization entity (e.g., Payfacto)), assuming the onboarding records were approved, these TIDs are made available for usage under the given MID. In one embodiment, regarding the payment processor-wide MID (e.g., Stripe-wide MID), a single merchant ID to represent a payment processor-wide merchant is onboarded and assigned. As the other MIDs, this special payment processor-wide MID attempts to have its own constant pool of available TIDs. This MID also has a single TID under it that can be used as a last resort fallback (described in more detail below).

In one embodiment, the payment processor executes an onboarding pipeline for onboarding a merchant and their terminal readers. In one embodiment, the onboarding pipeline includes a number of executable tasks that are part of one or more jobs. For example, the PayfactoDailyMerchantBoardingCreator job ingests the merchant data and builds an onboarding file from it, which is translated into an XML file and dropped into the appropriate file transfer endpoint (e.g., an SSH File Transfer Protocol (SFTP) server) for the transaction authorizing entity (e.g., Payfacto) to pick up. In one embodiment, the payment processor keeps track of the data that is sent in the onboarding file in order for reconciliation later. In one embodiment, for each merchant, the payment processor adds a <MERCHANT> branch in the onboarding file to first add the merchant to a system of transaction authorizing entity (e.g., Payfacto), add a <DCARD> branch in the onboarding file to add the ability for the merchant to run debit transactions, and finally adds n <TERMINAL> branches in the onboarding file to pre-allocate terminal readers with TIDs for this merchant to use. Any <MERCHANT>, <DCARD>, or <TERMINAL> branch always references the merchant ID (MID) of the merchant that is being affected. In one embodiment, a submission record, referred to herein as OnboardingSubmissionRecord, represents a single merchant being onboarded with debit card support and terminals. In one embodiment, any related fields and values passed in the onboarding file are persisted so that when the payment processor parses the onboarding response files later, the payment processor creates an onboarding results record, referred to herein as OnboardingResultRecord, that tracks the response data and uses a reconciler that then matches up each submission record with its result record to make sure that the payment processor has actually successfully onboarded merchants.

In one embodiment, the transaction authorizing entity provides an onboarding response file on the same endpoint (e.g., SFTP endpoint/server) or another endpoint from which it may be obtained by the payment processor. An interpreter gets the parsed contents of each onboarding response file and translates this content into data to be passed onto a reconciler. In one embodiment, the response records are parsed for the <MERCHANT>, <DCARD>, or <TERMINAL> branches that the payment processor sent in the onboarding file. For each set of features being added or modified for a particular merchant ID, a record is created, referred to herein as OnboardingResultRecord, that stores the received response data for the merchant and any debit card support or terminals that were attempted to add. In one embodiment, each <MERCHANT>, <DCARD>, or <TERMINAL> branch from the onboarding file has its own result code and there is a one-to-one mapping from the result record to a submission record that was created earlier.

The reconciler examines each result record and queries for the corresponding submission record. The reconciler reconciles each result record with its corresponding submission record and then makes sure the onboarding status of each merchant attempting to be onboarded is updated based on the result data.

As discussed above, for each merchant, the payment processor pre-registers, or pre-allocates, a pool of terminal reader IDs (e.g., 1 TID, 10 TIDs, 100 TIDs, any number of TIDs, etc.). In one embodiment, the payment processor also maintains a large pool of pre-registered, or pre-allocated, terminal IDs (TIDs) under the payment processor Merchant ID (MID). In one embodiment, the pool includes approximately 100 pre-allocated TIDs. However, any number of pre-allocated TIDs can be used. In one embodiment, the pool has a larger number of such TIDs as the merchant launches on the payment platform.

In one embodiment, the payment processor has, for each merchant, a pool of pre-registered, or pre-allocated, terminal reader IDs (e.g., 1 TID, 10 TIDs, 100 TIDs, any number of TIDs, etc.) and then eventually scales up to a minimum that is needed if a merchant starts rolling out many terminal readers for an event (e.g., a concert festival). In the case of such an event or at any time, if a merchant is registered but the payment processor runs out of pre-allocated terminal reader IDs, the payment processor uses a terminal ID that is pre-allocated and assigned to the payment processor (e.g., Stripe) in the transaction authorization request (message) to the transaction authorizing entity to get the transaction authorized. Thus, in one embodiment, the payment processor can potentially use a pre-allocated TID that is assigned to an entity other than the merchant for authorizing a transaction for the merchant.

In an alternative embodiment, the payment processor can potentially use a pre-allocated TID from one of four different sources for transaction authorization. For example, if a merchant of the payment processor (e.g., Stripe) makes a transaction (e.g., an Interac transaction, etc.) with a terminal reader, the payment processor determines a TID to use in the transaction's authorization message according to the following:

1) If the merchant already has an assigned MID and the terminal reader already has a TID assigned under this MID, then this TID is used for this reader in the transaction authorization request;
2) If the merchant already has an assigned MID but the terminal reader does not yet have a TID assigned under this MID, then the payment processor attempts to find an available TID to assign the reader from the pool of pre-allocated TIDs of the merchant;
3) If unsuccessful, thereby indicating that this merchant has not yet been onboarded and therefore does not have an assigned MID or it does have its own assigned MID but all the pre-allocated TIDs under that MID are already in use, then the payment processor tries to find an available TID under the payment processor (e.g., Stripe)-wide MID to use in the interim until more available TIDs (e.g., pre-allocated TIDs) are obtained for the merchant if the merchant has already been onboarded or an initial set of pre-allocated TIDs if the merchant is in the process of being onboarded. In one embodiment, in this case, the payment processor-wide MID is used until the merchant is able to have available TIDs under its own MID.

4) If all else fails and the payment processor-wide MID does not have available TIDs, use the last resort TID under the payment processor (e.g., Stripe)-wide MID. In one embodiment, when this occurs, an alert is generated indicating that pre-allocated TIDs are low, which causes a terminal onboarding job to run to obtain additional TIDs for the merchant.

Example Transaction Processing Flows

Figure 4:
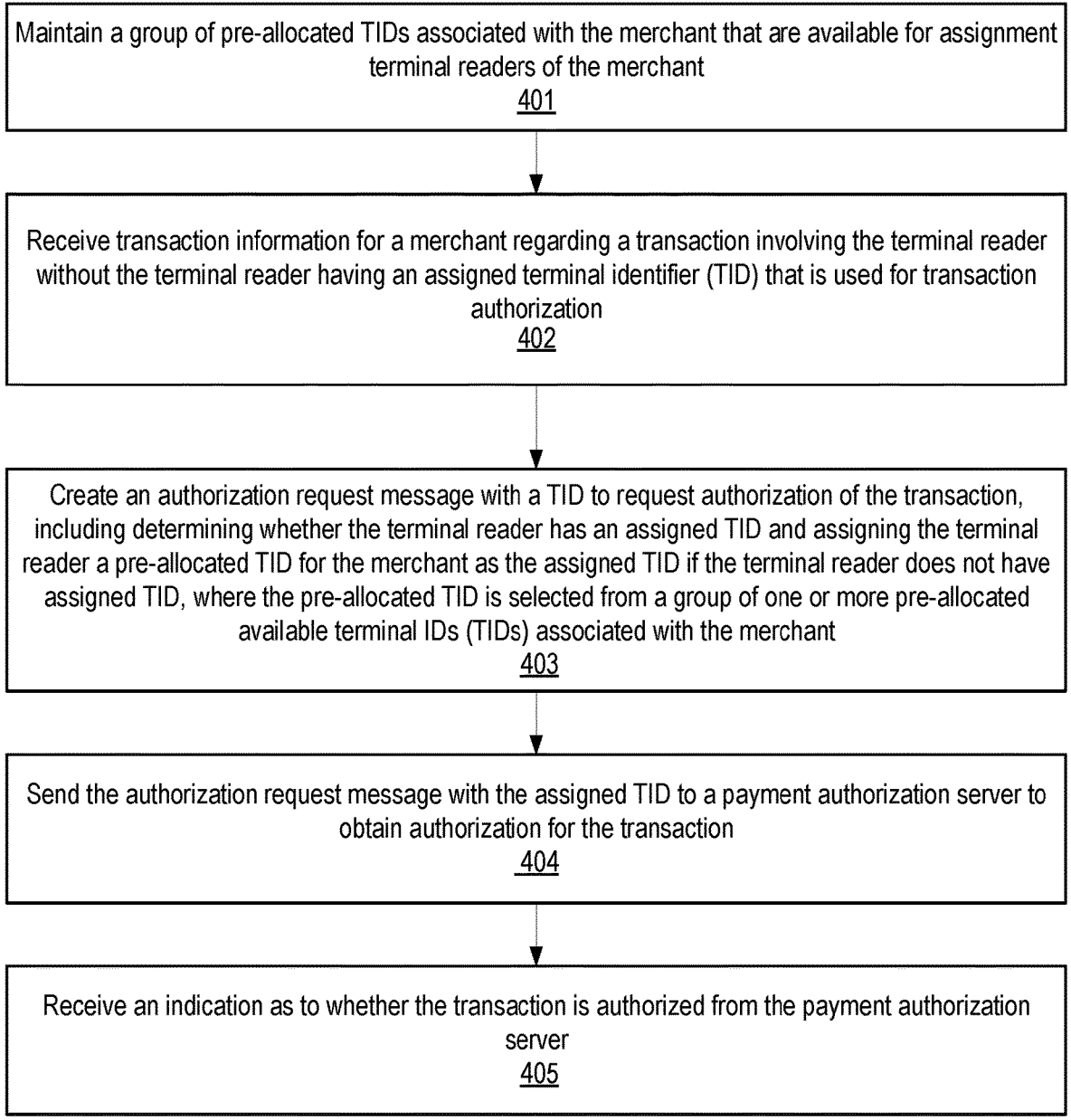
FIG. 4 is a flow diagram of one embodiment of a process for processing a commerce transaction performed with a terminal reader for reading a card.

FIG. 4 is a flow diagram of one embodiment of a process for processing a commerce transaction performed with a terminal reader for reading a card. The process is performed by processing logic that comprises hardware (e.g., circuitry, dedicated logic, etc.), software (e.g., software running on a chip, software run on a general-purpose computer system or a dedicated machine, etc.), firmware, or a combination of the three. In one embodiment, the operations in the process are performed by a payment processing system. While the payment processing system is shown as one system, in one embodiment, the payment processing system is implemented with more than one system (e.g., a plurality of processing devices, servers, computer systems, etc.)

Referring to FIG. 4, the process begins by maintaining a group of pre-allocated TIDs associated with the merchant that are available for assignment terminal readers of the merchant (processing block 401). In one embodiment, maintaining the group of pre-allocated TIDs associated with the merchant that are available for assignment terminal readers of the merchant is performed by an onboarding server.

In one embodiment, maintaining the group of pre-allocated TIDs associated with the merchant that are available for assignment terminal readers of the merchant comprises determining whether a group of pre-allocated terminal IDs (TIDs) that haven't been not assigned yet to any terminal reader of the merchant are less in number than a threshold for the merchant and, in response to determining that the group of pre-allocated terminal IDs (TIDs) that have not been not assigned yet to any terminal reader of the merchant are less in number than a threshold for the merchant, then sending information, via a network communication using a network communication interface, to an onboarding server that performs TID allocation to allocate a set of one or more new pre-allocated TIDs for the group.

In one embodiment, the threshold number of available TIDs is a predetermined number based on the new terminal readers a merchant is likely to connect to the payment system and bring on-line for processing transactions at any one time. This could be 1, 2, 3, . . . or any number of new terminal readers that the merchant is bringing on-line. This determination may occur when a merchant is being onboarded or after a merchant has been onboarded. In the latter case, the determination is made to ensure that one or more pre-allocated TIDs is available to be assigned to terminal readers of the merchant that produce commerce transactions prior to their allocation in the payment system to enable such transactions to gain approval or authorization, thereby providing instantaneous onboarding. In one embodiment, determining whether a group of terminal IDs (TIDs) that haven't been not assigned yet to any terminal reader of the merchant are less in number than a threshold for the merchant is performed by an onboarding server.

In one embodiment, the information sent to the TID allocation server to create additional pre-allocated TIDs that can be assigned to terminal readers of the merchant comprises a new onboarding record listing one or more TID to be pre-allocated. In one embodiment, the TID allocation server comprises the payment authorization server. For example, in a financial system such as Interac, the payment authorization server comprises a Payfacto server.

Subsequently, processing logic receives transaction information for a merchant regarding a transaction involving the terminal reader without the terminal reader having an assigned terminal identifier (TID) that is used for transaction authorization (processing block 402). In one embodiment, the transaction information is received by a network communication interface of a payment processing system (e.g., computer system, server, etc.) as a network (e.g., Internet, etc.) communication.

In response to receiving the transaction information, processing logic creates an authorization request message with a TID to request authorization of the transaction, including determining whether the terminal reader has an assigned TID and assigning the terminal reader a pre-allocated TID for the merchant as the assigned TID if the terminal reader does not have assigned TID, where the pre-allocated TID is selected from a group of one or more pre-allocated available terminal IDs (TIDs) associated with the merchant (processing block 403). In one embodiment, the authorization request message is created via one or more payment processing systems (e.g., computer system, server, etc.).

After creating the authorization request message, processing logic sends the authorization request message with the assigned TID to a payment authorization server to obtain authorization for the transaction (processing block 404). In one embodiment, processing logic sends the authorization request message as a network communication over a network (e.g., the Internet, etc.) using a network communication interface of a payment processing system.

Thereafter, processing logic receives an indication as to whether the transaction is authorized from the payment authorization server (processing block 405). In one embodiment, the processing logic that received the indication is part of one or more of the payment processing systems.

Figure 5:
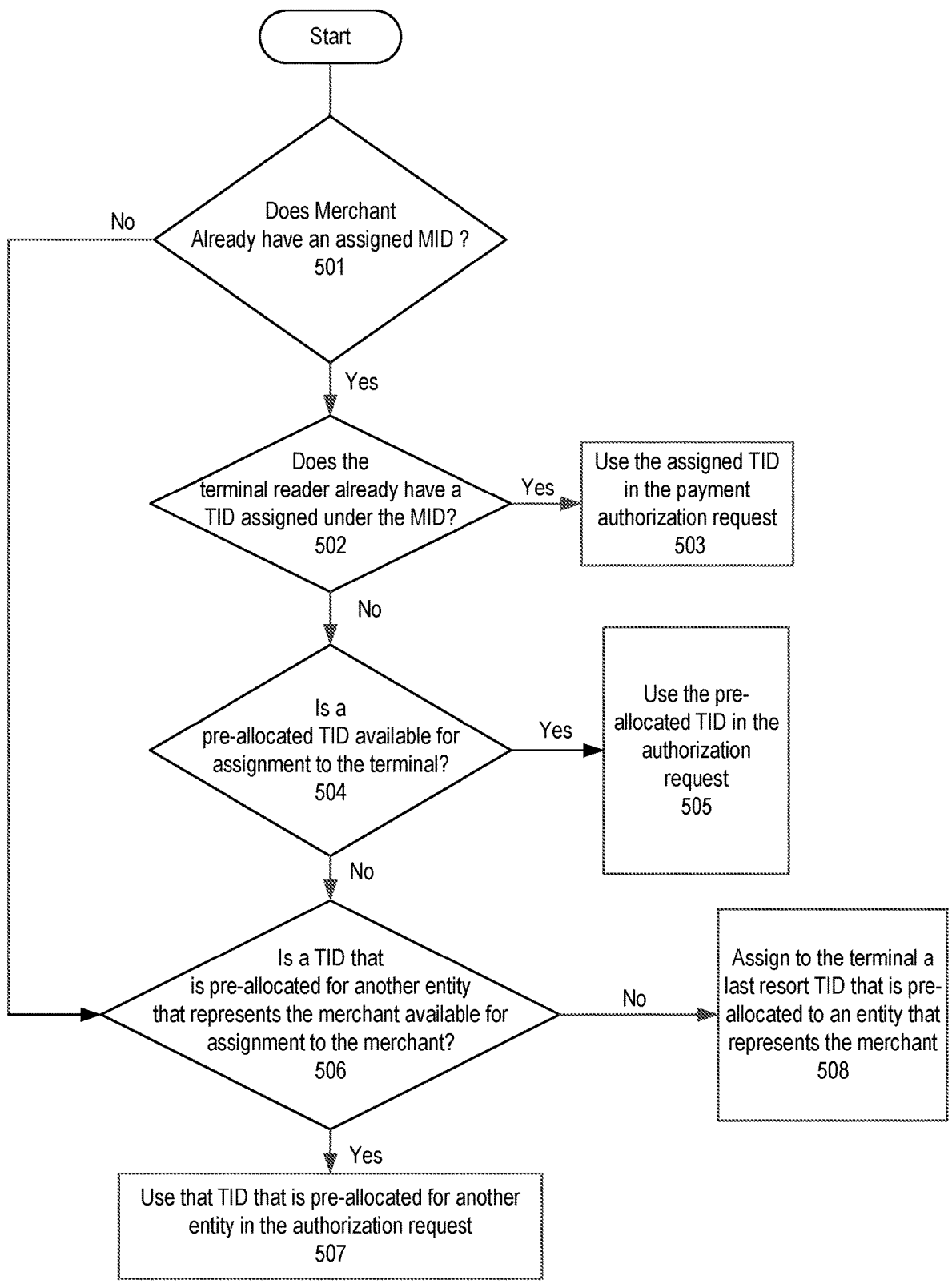
FIG. 5 is a flow diagram of one embodiment of a process for determining a terminal identifier (TID) to use in the authorization message of the transaction.

FIG. 5 is a flow diagram of one embodiment of a process for determining a terminal identifier (TID) to use in the authorization message of the transaction. The process is performed by processing logic that comprises hardware (e.g., circuitry, dedicated logic, etc.), software (e.g., software running on a chip, software run on a general-purpose computer system or a dedicated machine, etc.), firmware, or a combination of the three. In one embodiment, the operations in the process are performed by a payment processing system. While the payment processing system is shown as one system, in one embodiment, the payment processing system is implemented with more than one system (e.g., a plurality of processing devices, servers, computer systems, etc.).

Referring to FIG. 5, the process begins by processing logic determines whether the merchant already has an assigned MID (processing block 501). If processing logic determines the merchant already has an assigned MID, processing logic determines whether the terminal reader already has a TID assigned under the MID (processing block 502). In response to determining that the merchant already has an assigned MID and the terminal reader already has a TID assigned under the MID, processing logic uses the assigned TID in the payment authorization message (processing block 503). Note that in one embodiment, the payment authorization message is a request that is sent over a network (e.g., the Internet) to a payment authorizing entity (e.g., Payfacto).

If processing logic determines that the merchant has an assigned MID but the terminal reader does not have a TID assigned under the MID, then processing logic determines if a pre-allocated TID is available for assignment to the terminal (processing block 504). If a pre-allocated TID to the terminal is available for assignment to the terminal, then processing logic assigns the pre-allocated TID to the terminal and then uses the pre-allocated TID in the authorization message (processing block 505).

In one embodiment, in response to determining that the merchant does not have an assigned MID or determining that there is no available pre-allocated TID that is assigned to the merchant, processing logic transitions to processing block 506 where processing logic checks whether there is a TID that is pre-allocated for another entity that represents the merchant and is available for assignment to the merchant. In one embodiment, this entity is the payment processor (e.g., Stripe) and/or associated with the one or more payment processing servers for the merchant. If there is a TID that is pre-allocated for another entity that represents the merchant and is available for assignment to the merchant, then processing logic uses that TID that is pre-allocated for another entity in the authorization message (processing block 507). Note that this assignment is optional and may not be used in some payment processing systems.

In one embodiment, in response to determining that there is no available pre-allocated TID that is assigned to another entity that represents the merchant, then processing logic assigns the terminal a last resort TID that is pre-allocated to an entity that represents the merchant and then uses the last resort TID in the authorization message (processing block 508). In one embodiment, this entity is the payment processor (e.g., Stripe) and/or associated with the one or more payment processing servers for the merchant. Note that this assignment is optional and may not be used in some payment processing systems.

Figure 6:
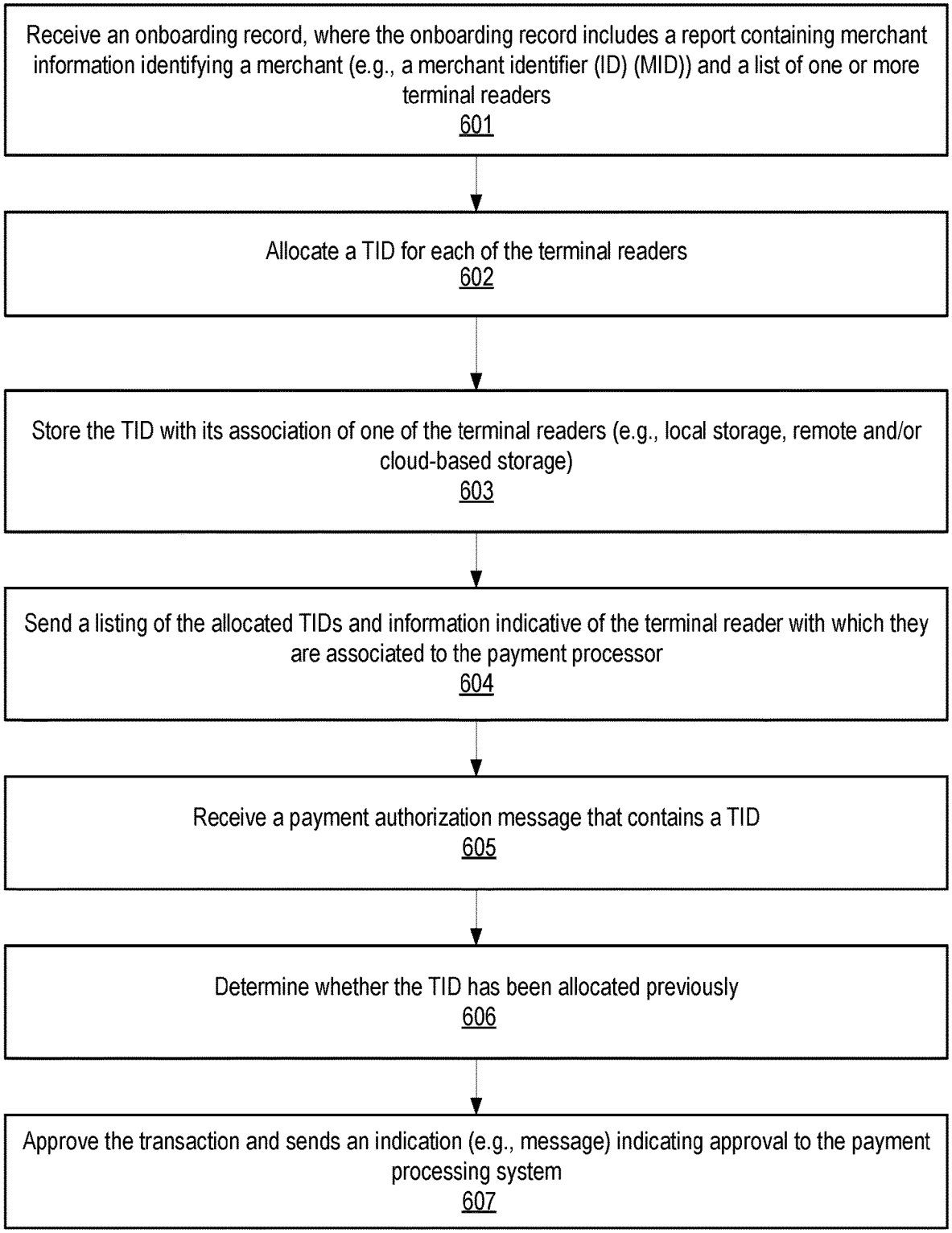
FIG. 6 is a flow diagram of one embodiment of a process for allocating TIDs and handling transaction authorization requests.

FIG. 6 is a flow diagram of one embodiment of a process for allocating TIDs and handling transaction authorization requests. The process is performed by processing logic that comprises hardware (e.g., circuitry, dedicated logic, etc.), software (e.g., software running on a chip, software run on a general-purpose computer system or a dedicated machine, etc.), firmware, or a combination of the three. In one embodiment, the operations in the process are performed by a payment authorization entity. While the payment authorization entity may be implemented as one system, in one embodiment, the payment authorization entity is implemented with more than one system (e.g., a plurality of processing devices, servers, computer systems, etc.).

Referring to FIG. 6, the process begins by processing logic receives an onboarding record, where the onboarding record includes a report containing merchant information identifying a merchant (e.g., a merchant identifier (ID) (MID)) and a list of one or more terminal readers (processing block 601). In one embodiment, the processing logic is part of a payment authorization server. In one embodiment, the onboarding record is received from a system of a payment processor (e.g., Stripe) or a related entity.

In response to receiving the onboarding record, processing logic allocates a TID for each of the terminal readers (processing block 602), stores the TID with its association of one of the terminal readers (e.g., local storage, remote and/or cloud-based storage) (processing block 603) and sends a listing of the allocated TIDs and information indicative of the terminal reader with which they are associated to the payment processor (processing block 604).

Subsequently, processing logic receives a payment authorization message that contains a TID (processing block 605). In one embodiment, the authorization message is a request to seek approval of a transaction. In one embodiment, the processing logic is part of a payment authorization server. In response thereto, processing logic determines whether the TID has been allocated previously (processing block 606). In one embodiment, this is performed by accessing storage to determine if the TID exists and is valid.

If processing logic determines the TID in the payment authorization message is valid, processing logic approves the transaction and sends an indication (e.g., message) indicating approval to the payment processing system (processing block 607); otherwise, the processing logic sends an indication to the payment processing system that the transaction is not approved. Note that in some embodiments approval of the transaction includes requirements that must be met in addition to the presence of a valid TID in the payment authorization message.

An Example Computer System

FIG. 7 is one embodiment of a computer system that may be used to support the systems and operations discussed herein. It will be apparent to those of ordinary skill in the art, however, that other alternative systems of various system architectures may also be used.

The data processing system illustrated in FIG. 7 includes a bus or other internal communication means 715 for communicating information, and a processor(s) 710 coupled to the bus 715 for processing information. The system further comprises a random-access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor(s) 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

In one embodiment, processor(s) 710 executes instructions to perform any of the operations described above including receiving transaction information for a merchant regarding a transaction involving the terminal reader, creating an authorization request message to request authorization of the transaction, including determining whether the terminal reader has an assigned TID and assigning the terminal reader a pre-allocated TID for the merchant as the assigned TID if the terminal reader has no assigned TID, sending the authorization request message with the TID to a payment authorization server to obtain authorization for the transaction, and receiving an indication as to whether the transaction is authorized. In one embodiment, as part of an onboarding server, processor(s) 710 executes instructions to maintain the group of pre-allocated available TIDs associated with the merchant. This may include determining whether TIDs in the group not yet assigned to any terminal reader of the merchant are less in number than a threshold for the merchant, and in response to determining that TIDs in the group not yet assigned to any terminal reader of the merchant number less than a threshold for the merchant, sending information (e.g., an onboarding record) to a TID allocation server, which may or may not be part of a transaction or payment authorization server, to allocate a set of one or more new TIDs for the group.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 785, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need to be present for the device to function.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for processing a commerce transaction performed with a terminal reader for reading a card, the method comprising:
   receiving, by network communication interface, transaction information for a merchant regarding a transaction involving the terminal reader without the terminal reader having an assigned terminal identifier (TID) that is used for transaction authorization;
   in response to receiving the transaction information, creating, via one or more payment processing servers, an authorization request message with a new TID to request authorization of the transaction, wherein creating the authorization request message includes:
      in response to determining the terminal reader does not have an assigned TID and no pre-allocated TIDs from a group of pre-allocated TIDs assigned to the merchant are available,
      determining whether the merchant has an assigned merchant identifier (MID); and
      in response to determining the merchant has the assigned MID, inserting, in the authorization message, the new TID that is pre-allocated and assigned to a payment processor that is associated with the merchant;
   sending, over a network via a network communication, the authorization request message with the new TID to a payment authorization server to obtain authorization for the transaction; and
   receiving, by the one or more payment processing servers from the payment authorization server, an indication as to whether the transaction is authorized; and
   maintaining, by an onboarding server, the group of pre-allocated (TIDs) assigned to the merchant, wherein maintaining the group of pre-allocated TIDs assigned to the merchant comprises:
      determining, by the onboarding server, whether pre-allocated TIDs in the group of pre-allocated TIDs not yet assigned to any terminal reader of the merchant are less in number than a threshold for the merchant, and
      in response to determining that pre-allocated TIDs in the group of pre-allocated TIDs in the group not yet assigned to any terminal reader of the merchant number is less in number than the threshold for the merchant, sending information, via a network communication using a network communication interface, to a TID allocation server to allocate a set of one or more new TIDs for the group.

2. The method defined in claim 1 wherein the TID allocation server comprises the payment authorization server.

3. The method defined in claim 1 wherein the information comprises a new onboarding record for a TID to be pre-allocated.

4. The method defined in claim 1 wherein determining the TID to use in the authorization message of the transaction comprises:
   determining whether the terminal reader already has a TID assigned under the MID;
   in response to determining that the merchant already has an assigned MID and the terminal reader already has a TID assigned under the MID, then using the assigned TID in the authorization message; and
   in response to determining that the merchant has an assigned MID but the terminal reader does not have a TID assigned under the MID, then assigning the pre-allocated TID to the terminal reader if available for assignment to the terminal reader and then using the pre-allocated TID in the authorization message.

5. The method defined in claim 4 wherein, in response to determining that the merchant does not have an assigned MID, assigning to the terminal reader a first TID that is pre-allocated for a MID representing an entity other than the merchant and then using the first TID in the authorization message.

6. The method defined in claim 5 wherein the entity comprises the payment processor associated with the one or more payment processing servers.

7. The method defined in claim 5 in response to determining that the merchant does not have an assigned MID and no pre-allocated TID assigned to the entity is available, then assigning to the terminal reader a last resort TID that is pre-allocated to the entity and then using the last resort TID in the authorization message.

8. A system for processing a commerce transaction performed with a terminal reader for reading a card, the system comprising:
   a network interface to receive transaction information for a merchant regarding a transaction involving the terminal reader without the terminal reader having an assigned terminal identifier (TID) that is used for transaction authorization;
   a memory to store instructions;
   one or more processors coupled to the memory and the network interface to execute the stored instructions to:
      in response to receiving the transaction information, create an authorization request message with a new TID to request authorization of the transaction, wherein the one or more processors create the authorization request message by
      in response to determining the terminal reader does not have an assigned TID and no pre-allocated TIDs from a group of pre-allocated TIDs assigned to the merchant are available,
         determining whether the merchant has an assigned merchant identifier (MID); and
         in response to determining the merchant has the assigned MID, inserting, in the authorization message, the new TID that is pre-allocated and assigned to a payment processor that is associated with the merchant;
      send, via the network interface, a network communication comprising the authorization request message with the new TID to a payment authorization server to obtain authorization for the transaction;
      perform payment processing operations to complete the transaction in response to receipt by the network interface of an indication that the transaction is authorized; and
      maintain the group of pre-allocated TIDs assigned to the merchant, by determining, by the onboarding server, whether TIDs in the group not yet assigned to any terminal reader of the merchant are less in number than a threshold for the merchant, and in response to determining that TIDs in the group not yet assigned to any terminal reader of the merchant number is less than a threshold for the merchant, sending information, via a network communication using a network communication interface, to a TID allocation server to allocate a set of one or more new TIDs for the group.

9. The system defined in claim 8 wherein the TID allocation server comprises the payment authorization server.

10. The system defined in claim 8 wherein the information comprises a new onboarding record for a TID to be pre-allocated.

11. The system defined in claim 8 wherein the one or more processors determine the TID to use in the authorization message of the transaction by:

determining whether the merchant already has an assigned MID and whether the terminal reader already has a TID assigned under the MID;

in response to determining that the merchant already has an assigned MID and the terminal reader already has a TID assigned under the MID, then using the assigned TID in the authorization message; and in response to determining that the merchant has an assigned MID but the terminal reader does not have a TID assigned under the MID, then assigning the pre-allocated TID to the terminal reader if available for assignment to the terminal reader and then using the pre-allocated TID in the authorization message.

12. The system defined in claim 11 wherein the one or more processors, in response to determining that the merchant does not have an assigned MID, assign to the terminal reader a first TID that is pre-allocated for a MID representing an entity other than the merchant and then using the first TID in the authorization message.

13. The system defined in claim 12 wherein the entity comprises the payment processor associated with the one or more payment processing servers.

14. The system defined in claim 12 wherein the one or more processors, in response to determining that the merchant does not have an assigned MID and no pre-allocated TID assigned to the entity is available, assign to the terminal reader a last resort TID that is pre-allocated to the entity and then using the last resort TID in the authorization message.

15. One or more non-transitory computer readable storage media having instructions stored thereupon which, when executed by a system having at least a processor and a memory therein, cause the system to perform operations for processing a commerce transaction performed with a terminal reader for reading a card, the operations comprising:

receiving, by network communication interface, transaction information for a merchant regarding a transaction involving the terminal reader without the terminal reader having an assigned terminal identifier (TID) that is used for transaction authorization;

in response to receiving the transaction information, creating, via one or more payment processing servers, an authorization request message with a new TID to request authorization of the transaction, wherein creating the authorization request message includes:

in response to determining the terminal reader does not have an assigned TID and no pre-allocated TIDs from a group of pre-allocated TIDs assigned to the merchant are available, determining whether the merchant has an assigned merchant identifier (MID); and in response to determining the merchant has the assigned MID, inserting, in the authorization message, the new TID that is pre-allocated and assigned to a payment processor that is associated with the merchant;

sending, over a network via a network communication, the authorization request message with the new TID to a payment authorization server to obtain authorization for the transaction;

receiving, by the one or more payment processing servers from the payment authorization server, an indication as to whether the transaction is authorized; and maintaining, by an onboarding server, the group of pre-allocated TIDs assigned to the merchant, wherein maintaining the group of pre-allocated TIDs assigned to the merchant comprises determining, by the onboarding server, whether TIDs in the group not yet assigned to any terminal reader of the merchant are less in number than a threshold for the merchant, and in response to determining that TIDs in the group not yet assigned to any terminal reader of the merchant number is less than a threshold for the merchant, sending information, via a network communication using a network communication interface, to a TID allocation server to allocate a set of one or more new TIDs for the group.

16. The storage media defined in claim 15 wherein the TID allocation server comprises the payment authorization server.

17. The storage media defined in claim 15 wherein the information comprises a new onboarding record for a TID to be pre-allocated.

18. The storage media defined in claim 15 wherein determining the TID to use in the authorization message of the transaction comprises:

determining whether the terminal reader already has a TID assigned under the MID;

in response to determining that the merchant already has an assigned MID and the terminal reader already has a TID assigned under the MID, then using the assigned TID in the authorization message; and in response to determining that the merchant has an assigned MID but the terminal reader does not have a TID assigned under the MID, then assigning the pre-allocated TID to the terminal reader if available for assignment to the terminal reader and then using the pre-allocated TID in the authorization message;

in response to determining that the merchant does not have an assigned MID, then assigning to the terminal reader a first TID that is pre-allocated for a MID representing an entity other than the merchant and then using the first TID in the authorization message;

in response to determining that the merchant does not have an assigned MID and no pre-allocated TID assigned to the entity is available, then assigning to the terminal reader a last resort TID that is pre-allocated to the entity and then using the last resort TID in the authorization message.

19. The storage media defined in claim 18 wherein the entity comprises the payment processor associated with the one or more payment processing servers.

\* \* \* \* \*